United States Patent [19]
Johnsen et al.

[11] Patent Number: 6,121,619
[45] Date of Patent: Sep. 19, 2000

[54] FAILURE PREDICTOR FOR PHOTOMULTIPLIER TUBES

[75] Inventors: Robert J. Johnsen, Milwaukee, Wis.; Nicholas Waterton, Mississauga, Canada; Burke D. Brunet, Mandeville, La.

[73] Assignee: General Electric Company, Milwaukee, Wis.

[21] Appl. No.: 09/133,722

[22] Filed: Aug. 13, 1998

[51] Int. Cl.⁷ .................................................. G01T 1/208

[52] U.S. Cl. ............... 250/369; 250/363.03; 250/363.09; 250/367; 250/368

[58] Field of Search ............................. 250/369, 363.09, 250/363.03, 367, 368

[56] References Cited

U.S. PATENT DOCUMENTS

| | | | |
|---|---|---|---|
| 5,384,699 | 1/1995 | Levy et al. | 250/363.03 |
| 5,512,755 | 4/1996 | Vickers et al. | 250/363.09 |
| 5,525,794 | 6/1996 | Gibbons | 250/363.09 |

*Primary Examiner*—Constantine Hannaher
*Assistant Examiner*—Otilia Gabor
*Attorney, Agent, or Firm*—Quarles & Brady; Christian G. Cabou; Phyllis Y. Price

[57] ABSTRACT

A method for predicting PMT failure in a gamma camera by generating historical data for each PMT in a gamma camera indicating high voltage gain values at which each PMT causes autotune failure. The historical data is analyzed to predict PMT failure accurately thereby allowing PMT maintenance prior to failure actually occurring.

26 Claims, 3 Drawing Sheets

FIG. 1

|     | C-1 | C-2 | C-3 | C-4 | C-5 | ... | C-99 | C-100 | C-101 |
|-----|-----|------|------|------|------|-----|-------|-------|-------|
|     | PMT | $t_1$ | $t_2$ | $t_3$ | $t_4$ | ... | $t_{98}$ | $t_{99}$ | $t_{100}$ |
| R-1 | 1-1 | 1173 | 1175 | 1175 | 1180 | ... | 1700 | 1705 | 1715 |
| R-2 | 1-2 | 1173 | 1175 | 1195 | 1205 | ... | 1800 | 1810 | 1812 |
| R-3 | 1-3 | 1173 | 1300 | 1405 | 1455 | ... | 2000 | 2080 | 2100 |
| R-61 | 9-5 | 1173 | 1175 | 1180 | 1205 | ... | 1900 | 1920 | 1940 |
| R-62 | 9-6 | 1173 | 1330 | 1500 | 1755 | ... | 2280 | 1175 | 1190 |
| R-63 | 9-7 | 1173 | 1175 | 1195 | 1200 | ... | 1900 | 1918 | 1922 |

FAILURE PREDICTOR FOR PHOTOMULTIPLIER TUBES

BACKGROUND OF THE INVENTION

The present invention relates to gamma cameras and more particularly to a method for predicting failure of photomultiplier tubes (PMTs) prior to failure occurring.

Single photon emission computed tomography (SPECT) examinations are carried out by injecting a dilution marker comprising a compound labeled with a radiopharmaceutical into the body of a patient to be examined. A radiopharmaceutical is a substance that emits photons at one or more energy levels. By choosing a compound that will accumulate in an organ to be imaged, compound concentration, and hence radiopharmaceutical concentration, can be substantially limited to an organ of interest. A radiopharmaceutical that emits photons or gamma emissions which are approximately at a single known energy level is chosen. The organ to be imaged will be referred to as an organ of interest and an energy range which approximates the known energy level will be referred to as the marker range.

While moving through a patient's blood stream the marker, including the radiopharmaceutical, becomes concentrated in the organ of interest. By measuring the number of photons emitted from the organ of interest which are within the marker range, organ characteristics, including irregularities, can be identified.

To measure the number of emitted photons, one or more planar gamma cameras are used. After a marker has become concentrated within organ of interest, a camera is positioned at an imaging angle with respect to the organ of interest such that the organ is positioned within the camera's field of view FOV. The camera is designed to detect photons traveling along preferred paths within the FOV.

A gamma camera consists of a collimator, a scintillation crystal, a plurality of photo multiplier tubes (PMTs) and a camera processor. The collimator typically includes a rectangular lead block having a width dimension and a length dimension which together define the FOV. The collimator block forms tiny holes which pass therethrough defining the preferred photon paths. The preferred paths are unidirectional and perpendicular to the length of the collimator. The collimator blocks emissions toward the crystal along non-preferred paths.

The scintillation crystal is positioned adjacent the collimator on a side opposite the FOV and has an impact surface and an oppositely facing emitter surface. The impact surface defines a two dimensional imaging area A having a length L and a width W. Photons which pass through the collimator impact and are absorbed by the impact surface at impact points. The crystal emitter surface emits light from an emitter point adjacent the impact point each time a photon is absorbed. The amount of light emitted depends on the absorbed photon's energy level.

The PMTs typically include between 37 and 91 PMTs which are arranged in a two dimensional array which is positioned adjacent the emitter surface. Light emitted by the crystal is detected by the PMTs which are in the area adjacent the emitter point. Each PMT which detects light generates an analog intensity signal $S_i$. Intensity signal is proportional to the amount of light detected $S_i$ and a PMT intrinsic gain factor $G_i$. When a single photon is absorbed by the crystal, the emitted light is typically absorbed by several different PMTs such that several PMTs generate intensity signals simultaneously.

A separate autotuner is associated with each PMT and includes, among other things, an autotuner amplifier. The autotuner amplifier receives the intensity signal from an associated PMT and steps the signal up by an autotuner amplifier gain $G_a$ which is unique to the amplifier (i.e. each autotune amplifier is uniquely tuned) thereby generating an autotuner amplifier signal $S_a$. Each autotuner amplifier includes hardware for facilitating an autotuning procedure as will be described in more detail below.

A single high gain amplifier receives each autotuner amplifier signal $S_a$ and steps up the received signal $S_a$ by a high voltage gain $G_{hv}$ thereby generating a separate final signal $S_f$ for each PMT. Thus, each final signal $S_f$ generated by the high voltage amplifier can be expressed as:

$$S_f = S_i \times G_i \times G_a \times G_{hv} \qquad (1)$$

where $S_i$ is the initial detected light, $G_i$ is the intrinsic PMT gain, $G_a$ is the autotune amplifier gain and $G_{hv}$ is the high voltage amplifier gain. For the purposes of this explanation all final signals $S_f$ caused by a single photon will be collectively referred to as a signal set.

The processor receives each signal set and performs a plurality of calculations on each signal set to determine two characteristics of the corresponding photon. First, the processor combines the final signals $S_f$ of each signal set to identify the energy level of a corresponding photon. Photons having energies within the marker range will be referred to as events. Only signals corresponding to events are used for imaging. Second, the processor performs a series of calculations in an effort to determine precisely where on the impact surface imaging area A an event occurred. Once impact locations of all events have been identified, the processor uses the impact locations to create an image of the organ of interest which corresponds to the camera imaging angle.

To create a three dimensional image of the organ of interest, a gamma camera can be used to generate a plurality of images from different imaging angles. To this end, the camera is positioned parallel to, and at an imaging angle about, a rotation axis which passes through the organ of interest. The angle is incremented between views so that the plurality of images are generated. The plurality of images are then used to construct pictures of transaxial slices of the torso section using algorithms and iterative methods that are well known to those skilled in the tomographic arts.

With any imaging system there are several different criteria by which to judge system usefulness. One of the most important criteria for judging system usefulness is the quality of resulting images. As an initial matter, to generate a quality image, PMTs and associated amplifiers have to be capable of, given a specific intensity radiation source, generating a final signal for imaging having a known target value $S_{th}$. This requirement is discussed in more detail below.

Also, to a great extent, image quality depends on camera PMTs operating in predictable fashion. For example, assume an organ of interest is positioned in a camera FOV during a first imaging period and a first image is generated and used for diagnosis. If, during a subsequent imaging period, the same patient is positioned in the same FOV and a second image is generated, if one of the camera PMTs operates differently than it did during the first imaging period an unexpected image artifact may appear in the second image which effectively reduces the diagnostic value of the second image.

Unfortunately, despite recent improvements in PMT manufacturing, nearly all PMTs are characterized by decreasing intrinsic gains $G_i$, over their useful life. Thus, when a PMT is initially used its intrinsic gain $G_i$ is often relatively high but, over time, gain $G_i$ decreases appreciably. Complicating matters further, the rate at which intrinsic gain $G_i$ decreases is PMT specific (i.e. the rate of gain change is different between even identically constructed PMTs).

To compensate for decreasing intrinsic gains $G_i$, the industry has developed various PMT tuning processes. According to most tuning processes, prior to initially using a camera, a known light source is provided to each PMT. To this end often a uniform radiation source is provided in the camera FOV. Because the source is uniform, the crystal provides a uniform quantum of light to each PMT. In the alternative, some PMTs include a built in LED or other type of light source of known intensity between the crystal and the PMT. The LED is only turned on during autotuning. When the light source is provided a final signal $S_f$ (i.e. high voltage amplifier output signal) for each PMT is recorded.

Because light source intensity is known, a target value $S_{th}$ for the final signal is also known. During the tuning process, where the measured final signal $S_f$ is less than target value $S_{th}$, the autotune amplifier gain $G_a$ (see Equation 1) is increased thereby increasing the value of the final signal. Where the measured final signal $S_f$ is greater than target value $S_{th}$, gain $G_a$ (see Equation 1) is decreased thereby decreasing the value of final signal $S_f$ until it equals target value $S_{th}$.

During routine subsequent tuning processes, the known light source (e.g. flood or LED) is again provided to each PMT generating a final signal $S_f$ for each PMT. The final signal $S_f$ is again compared to target value $S_{th}$ for each PMT and each PMT autotuner amplifier gain $G_a$ is modified until an associated final signal $S_f$ is equal to target value $S_{th}$. Typically, intrinsic gains $G_i$ decrease over time and therefore gains $G_a$ are usually increased during the tuning process. Autotuner amplifier gains $G_a$ are stored and used later during normal diagnostic imaging.

While autotuning improves detector stability and extends the time period between required service calls, autotuning is only effective up to the point where amplifier gain $G_a$ is at its maximum value. Once gain $G_a$ has been increased to its maximum value, any further PMT degradation cannot be compensated by using the autotuner amplifier and an event referred to as autotune failure occurs. At this point an autotuner will typically indicate failure via an alarm.

Once any one of the autotune amplifier gains $G_a$ has been increased to its maximum gain value to compensate for PMT degradation, one way to increase PMT life even further is to increase high voltage gain $G_{hv}$. Referring again to Equation 1, during autotuning, assuming autotuner amplifier gain $G_a$, is at its maximum level and the final signal $S_f$ is still below target value $S_{th}$, by increasing high voltage gain $G_{hv}$ final signal $S_f$ can be increased further and until final signal $S_f$ is equal to target value $S_{th}$.

High voltage gain $G_{hv}$ is not PMT specific but rather is identical for all PMTs in a camera. Therefore, when gain $G_{hv}$ is increased to extend the life of one PMT, gain $G_{hv}$ is also increased for all other PMTs in an array. Referring yet again to Equation 1, when gain $G_{hv}$ is increased to extend the life of a first PMT but does not have to be increased to extend the life a second PMT, to compensate for increasing gain $G_{hv}$ in Equation 1 for the second PMT, autotuner amplifier gain $G_a$ is decreased in a manner similar to the increase in gain $G_{hv}$. For example, if $G_{hv}$ is increased by 10% to extend the life of the first PMT, the autotuner amplifier gain $G_a$ for the second PMT might be decreased by 10% (or some other suitable amount depending on how gains $G_a$ and $G_{hv}$ are implemented).

Despite gain $G_a$ and $G_{hv}$ modifications, over time, as the intrinsic PMT gain decreases, eventually a point is reached where, for some PMT within an array, both the autotuner amplifier gain $G_a$ and the high voltage gain $G_{hv}$ are at their maximum values. At this point, any further loss in intrinsic gain cannot be compensated for and an error as described above will result in an image produced using the PMT characterized by low intrinsic gain $G_i$. This event is referred to hereinafter as complete failure.

When complete failure (i.e. $G_{amax}$, $G_{hvmax}$) occurs and the camera cannot be used to generate precise images required for diagnostic purposes until the failed PMT is replaced. To this end, a technician or maintenance person must be notified and the PMT replaced.

Manual replacement of PMTs is disadvantageous for a number of reasons. First, as most medical facilities do not have in house imaging technicians, it may take hours or even days for a technician to replace a failed PMT. Not only is this a burden to patients who might have to reschedule imaging time but it is also expensive for a medical facility as imaging systems are expensive and therefore should be used as much as possible to justify their costs. Moreover, when a PMT is replaced, recallibration can be a relatively lengthy process resulting in further down time.

In addition, presently PMTs are only replaced after they fail and the failure signal is generated. Thus, while several PMTs may be near failure when a technician visits to replace a single PMT, the technician will only replace the single failed PMT.

To be more efficient, when a technician visits to replace one PMT, the technician might also replace other PMTs associated with autotune amplifiers which are at or near their maximum amplifier gains $G_a$ when high voltage gain $G_{hv}$ is near or at its maximum value.

Unfortunately, there is no good way to determine how close a specific PMT is to failure based solely on the instantaneous high voltage gain $G_{hv}$ and an autotuner amplifier gain $G_a$. This is because, as indicated earlier, even identically manufactured PMTs may deteriorate at different rates. Therefore, when high voltage gain $G_{hv}$ is near its maximum value, while one PMT having a maxed out autotuner amplifier gain $G_a$ may be near failure, another PMT having a maxed out gain $G_a$ may still have many hours of or even days of useful imaging life left.

Therefore, it would be advantageous to have a method for accurately predicting when a PMT is approaching failure so that PMTs can be replaced as close to their failure points as possible resulting in more efficient systems and less system down time.

SUMMARY OF THE INVENTION

The present invention includes a method for predicting when each PMT in a PMT array will fail so that the PMT can be replaced prior to failure. The method is extremely accurate so that PMTs will not be replaced prematurely and therefore, the useful life of PMTs is extended. Because PMT failure can be predicted prior to actual failure, PMTs which are near failure can be scheduled for maintenance during non-business hours so that there is no maintenance downtime. In addition, each time a technician visits to replace a PMT which is near failure, the technician can immediately determine if other PMTs are near failure and if so, can replace the other PMTs in a single operation. In the alternative, if PMT characteristics are remotely monitored (e.g. via the Internet), a technician can be provided with a report prior to visiting a facility and can thereby determine which, if any, PMTs need to be replaced.

To this end, the invention includes a method for use with a gamma camera which includes an array of PMTs, each PMT characterized by an intrinsic gain and providing an initial signal when light is detected. The camera also including a separate autotuner amplifier for each PMT, the amplifier receiving and modifying an initial signal as a function of an amplifier gain generating an autotuner signal.

The camera also includes a single high voltage amplifier which receives each autotuner signal and modifies each autotuner signal as a function of an adjustable high voltage gain thereby generating a final signal for each PMT. The camera further includes an autotuner for each autotuner amplifier which, when a light source of known intensity is used to excite an associated PMT, adjusts the gain of an associated autotuner amplifier such that each final signal is essentially equal to a target signal value. Complete failure occurs when both an autotune amplifier and the high voltage gain are at their highest values and an associated PMT's final signal is less than the target value.

The inventive method is for predicting complete failure and comprises the steps of, during a test sequence, (a) setting the high voltage gain to its maximum value, (b) monitoring each PMT for autotune failure, (c) when autotune failure first occurs in a PMT, storing the instantaneous high voltage gain as a failure point for the failed PMT, (d) when autotune failure has occurred in each PMT, skipping to step (g), (e) decreasing the high voltage gain by a fraction of the maximum value, (f) repeating steps (b) through (e); and (g) analyzing each recorded failure point to predict when complete failure will occur for each PMT.

One object of the invention is to provide a method whereby PMT failure can be predicted prior to failure actually occurring. To this end a PMT failure point can be used generally to determine the likely remaining useful life of a PMT. For example, if, during the test sequence a PMT failure point occurs while the high voltage gain is relatively high, PMT failure can be expected to occur relatively quickly. However, if the failure point for a PMT occurs only after the high voltage gain has been driven to a low value, PMT failure should not be expected to occur for some time.

Preferably, the method further includes the steps of, during consecutive periodic test sequences, correlating failure points with time and storing the time and failure points in a PMT data table for analysis during later analyzing steps.

Thus, another object is to generate historical data which can be used during the analyzing step to more accurately predict complete failure. It has been recognized that even identically manufactured PMTs may exhibit widely varying wear characteristics such that one PMT might fail well before another, one PMT may wear quickly during a first portion of its useful life and then wear more slowly during the last portion while another PMT may do just the opposite, or some PMTs may simply fluctuate in their wear characteristics over their useful life. By developing historical wear data for each PMT in an array, separate decisions can be made which are tailored to specific PMTs to determine when PMTs should be replaced.

For example, while amplifier gains associated with first and second PMTs may be set identically and therefore their failure points during the inventive test procedure would be identical (i.e. each would fail at the same high voltage gain value), the first PMT may be several months older than the second because it exhibited much slower wear characteristics. In this case, while it may be prudent to replace the second PMT in light of its rapid deterioration, the first PMT likely should be left unreplaced as that PMT probably still has some useful life left based on its prior history.

Another object which is related to the above objects is to reduce camera system down time. To this end, instead of waiting for autotune failure to replace PMTs, failure is predicted ahead of time and maintenance can be scheduled in advance to be conducted during off hours.

One other object is to reduce the number of maintenance sessions required to maintain a gamma camera system in working order. To this end, when one PMT is replaced, the historical data associated with all other PMTs in a camera can be observed and a technician can make an independent judgement as to when other PMTs should be replaced. In the alternative, a processor may, based on historical data, predict PMT failure and provide a technician a tentative replacement schedule.

The invention also includes an inventive apparatus for performing the method. To this end, the invention includes an apparatus for use with a gamma camera which includes an array of photomultiplier tubes (PMT), each PMT characterized by an intrinsic gain and providing an initial signal when light is detected. The camera also includes a separate autotuner amplifier for each PMT, the amplifier receiving and modifying an initial signal as a function of an amplifier gain generating an autotuner signal. The camera also includes a single high voltage amplifier which receives each autotuner signal and modifies each autotuner signal as a function of an adjustable high voltage gain thereby generating a final signal for each PMT.

The camera further includes an autotuner for each autotuner amplifier which, during a test procedure when a light source of known intensity is used to excite an associated PMT, adjusts the gain of an associated autotuner amplifier such that each final signal is essentially equal to a target value. Complete failure occurs when both an amplifier and the high voltage gains are at their highest values and an associated PMT's final signal is less than the target value.

The apparatus is for predicting complete failure and includes means for, during a test sequence, setting the high voltage gain to its maximum value and decreasing the high voltage gain from the maximum value to a minimum value, means for monitoring each PMT for autotune failure, when autotune failure first occurs in a PMT, means for storing the instantaneous high voltage gain as a failure point for the failed PMT, and means for analyzing each failure point to predict when complete failure will occur for each PMT.

Preferably the apparatus is also for generating historical data which can be used during the analyzing step to predict complete failure. To this end the apparatus further includes means for, during consecutive periodic test sequences, correlating failure points with time and storing the time and failure points in a PMT data table for analysis by the means for analyzing. Also, the means for analyzing may further includes means for, for each PMT, plotting the data in the data table and means for analyzing the resulting curve to predict complete failure as a function the trend exhibited by the resulting curve.

These and other objects, advantages and aspects of the invention will become apparent from the following description. In the description, reference is made to the accompanying drawings which form a part hereof, and in which there is shown a preferred embodiment of the invention. Such embodiment does not necessarily represent the full scope of the invention and reference is made therefor, to the claims herein for interpreting the scope of the invention.

DETAILED DESCRIPTION OF THE INVENTION

A. Hardware

Figure 1:
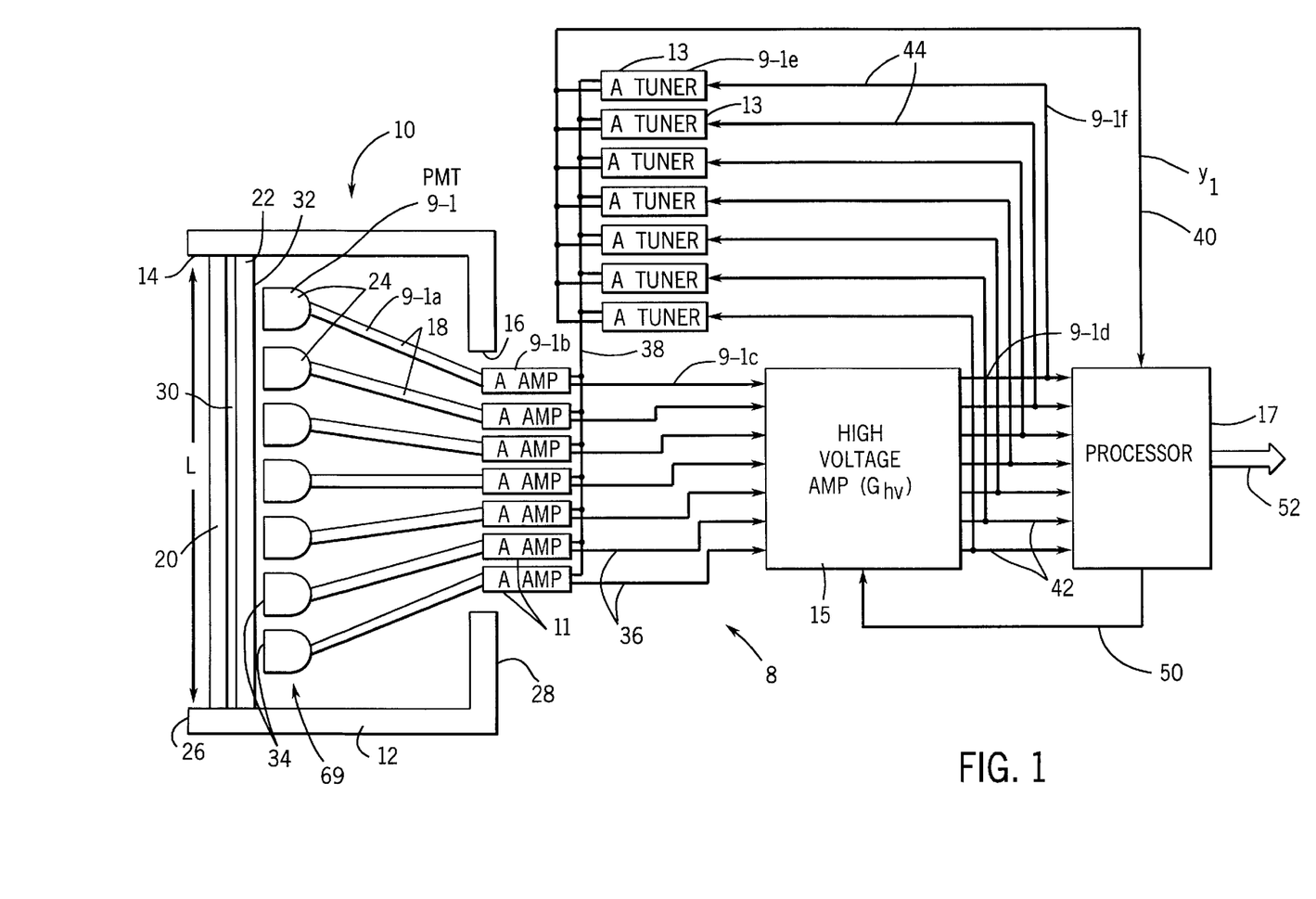
FIG. 1 is a schematic view of an inventive gamma camera system for performing the inventive method.

Referring now to the drawings, and more specifically, referring to FIG. 1, therein is illustrated an inventive gamma camera system 8 used to perform the inventive method. System 8 generally includes a single gamma camera detector 10, the plurality of autotune amplifiers collectively referred by numeral 11, a plurality of autotuners collectively referred to by numeral 13, a high voltage amplifier 15, a processor 17 and a plurality of data lines and buses which connect the aforementioned components in a manner described in more detail below.

Detector 10 includes a gamma attenuating boot 12, a collimator 20, a scintillation crystal 22, a plurality of photomultiplier tubes (PMTs) collectively referred to by numeral 24, and a plurality of data buses collectively referred to by numeral 18. Boot 12 is generally rectilinear having a front surface 26 and a rear surface 28. Front surface 26 forms a collimator receiving opening 14 while rear surface 28 forms an opening 16 opposite opening 14 to allow data buses 18 to pass therethrough.

Collimator 20 is planar having a length L and a width (not illustrated but perpendicular to length L) which are sized such that, when mounted in opening 14, collimator 20 effectively closes opening 14. As well known in the art, collimator 20 forms a plurality of apertures which define preferred photon flight paths passing through collimator 20 perpendicular to both the collimator's length and width. Thus, any photons passing through collimator 20 are directed at, and perpendicular to, crystal 22.

Figure 2:
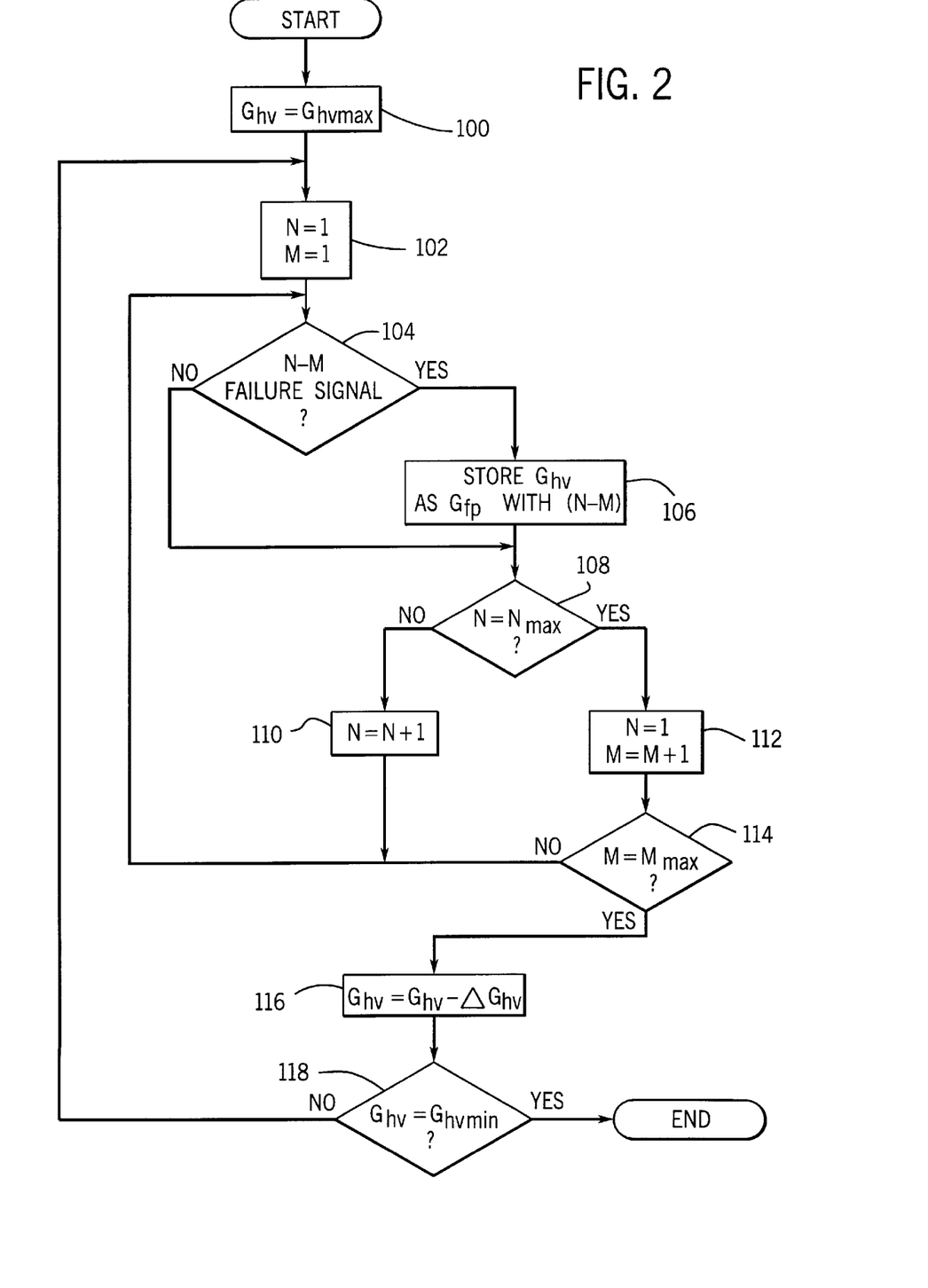
FIG. 2 is a flowchart illustrating the inventive method performed by the system of FIG. 1.

Referring still to FIG. 2, crystal 22, like collimator 20, is planar and has dimensions which are essentially identical to the collimator's length and width dimensions. Crystal 22 includes impact and emitter surfaces 30, respectively. Crystal 22 is mounted inside boot 12 with impact surface 30 facing collimator 20.

PMTs 24 are arranged to form a PMT array 69 adjacent crystal 22. Although some PMT arrays will be single dimensional, most arrays are two dimensional including PMTs arranged in a plurality of rows and columns. Referring still to FIG. 1, although only a single dimension of array 69 is illustrated, in the interests of simplifying this explanation, it will be assumed that detector 10 includes 63 separate PMTs arranged in nine columns and seven rows. Hereinafter, when a specific PMT 24 is referenced, the PMT will be referenced by both its row and column numbers. For example, a PMT in the fourth row and third column will be referenced as PMT 4-3. Also, to simplify this explanation, unless specified otherwise, signal processing will only be described with respect to PMT 9-1 (see FIG. 1) as all signal processing with respect to different PMTs is essentially identical. In addition, other system 8 components which are specifically associated with PMT 9-1 are also referred by the number 9-1 followed by a lower case letter (e.g. a, b, c, etc. . . . ).

Array 69 is mounted inside boot 12 such that detecting surfaces collectively referred to by numeral 34 face emitter surface 28 of crystal 22. Each PMT 24 is linked via a unique bus cable 18 to processing electronics which are explained in more detail below. PMT 9-1 is linked to bus 9-1a.

In operation, either one or two detectors 10 can be used to generate data for constructing diagnostic images. When two detectors 10 are used together, typically the two detectors 10 are positioned on opposite sides of an imaging area such that the detectors 10 oppose each other. Where a single detector is employed, the detector 10 is mounted in one location with respect to an imaging area.

With a marker, including radio pharmaceutical, accumulated within an organ of interest (i.e. an organ to be imaged) and with the organ positioned within the imaging area, photons produced by the radio pharmaceutical radiate from the organ in all directions. Photons directed at collimator 20 and perpendicular to the length and width of collimator 20 pass through collimator 20 and impact surface 30. Each photon passing through collimator 20 impacts surface 30 at a specific impact point and is absorbed by crystal 22. When a photon is absorbed by crystal 22 at an impact point, crystal 22 omits light from an emitter point on emitter surface 32. The emitter point is adjacent the photon impact point. Light emitted by crystal 22 is detected by detectors 24, each detector 24 generating an intensity signal which is proportional to the quantum of light detected.

For every absorbed photon, virtually every PMT 24 in detector 10 generates an intensity signal. PMTs 24 which are adjacent to or relatively close to the emitter point generate relatively high intensity signals while PMTs 24 which are a distance from the emitter point generate relatively lower intensity signals. In fact, while some emitted light is typically detected by each PMT 24, essentially all light emitted as a result of an absorbed photons will be sensed by detectors which are located proximate the emitter point.

Each bus cable 18 provides an intensity signal from an associated PMT 24 to a unique autotune amplifier 11. PMT 9-1 is linked via bus 9-1a to amplifier 9-1b. Each amplifier 11 increases the received intensity signal as a function of an amplifier gain $_{Ga}$ generating an amplified signal on a unique data line linked to high voltage amplifier 15. Data lines linking autotune amplifiers 11 to high voltage amplifier 15 are collectively referred to by numeral 36 and PMT 9-1 is specifically associated with line 9-1c.

High voltage amplifier 15 receives amplified signals on data lines 36 and increases each received signal as a function of a high voltage gain $G_{hv}$ providing final amplified signals $S_f$ to processor 17 via data lines collectively referred to by numeral 42. The final signals $f_f$ on lines 42 are used by processor 17 to form images.

A separate autotuner 13 is provided for each autotune amplifier 11 and controls an associated amplifiers gain $G_a$. To this end, a databus 38 links each autotuner 13 to a unique amplifier 11. Each autotuner 13 is only capable of driving amplifier gain $G_a$ to a maximum amplifier gain value $G_{amax}$. When an autotuner 13 increases an associated amplifier gain $G_a$ to the maximum value $G_{amax}$, the tuner 13 generates a failure signal $\zeta_1$ which is provided to processor 17 via a second bus 40 indicating the specific autotuner 13 which cannot increase its associated amplifier gain $G_a$ any higher.

Line 9-1d is associated with PMT 9-1 via line 9-1c and amplifier 9-1b. A separate feedback line (collectively, the feedback lines are referred to by numeral 44), provides each final signal $S_f$ on lines 42 to a unique and associated autotuner 13. For example, the feedback line 9-1f associated with the amplifier 9-1b which is, in turn, associated with PMT 9-1 provides a final signal $S_f$ to autotuner 9-1e. Feedback final signals $S_f$ are used by autotuners 13 during the inventive prediction procedure as will be described in more detail below.

In addition to the bus and line links described above, processor 17 is also linked to high voltage amplifier 15 via a single control line 50 by which processor 17 can modify the high voltage amplifier gain $G_{hv}$. In addition, processor 17 includes a databus 52 for providing imaging data to other electronic circuitry used for building diagnostic images. In the alternative, processor 17 may itself be capable of generating diagnostic images.

Referring again to Equation 1, the initial signals provided to each autotune amplifier 11 represent the first two terms (i.e. $S_iG_i$) as they reflect detected light and intrinsic gain of associated PMTs 24. Each amplifier 11 steps up its received signal by its amplifier gain $G_a$ (i.e. the third term on the right-hand side of Equation 1) and amplifier 15 steps up each received signal by its gain $G_{hv}$ (the fourth term on the right-hand side of Equation 1). Thus, each final signal $S_f$ on each of lines 42 is represented by Equation 1.

B. Inventive Method

According to the present invention, during a test sequence to generate data which can be used to predict autotune failure of PMTs 24, processor 17 sets the high voltage gain $G_{hv}$ of amplifier 15 to an extremely high value (e.t. 2300 volts) via a signal on line 50. For the purposes of this explanation, it will be assumed that the initial high voltage gain $G_{hv}$ is set to 2300 volts.

With the high voltage gain $G_{hv}$ set to its maximum value $G_{hvmax}$, PMTs 24 are exposed to a light source having a known intensity. To this end, either a uniform flood source of radiation can be provided in an imaging area adjacent impact side 30 of crystal 22 or, in the alternative, an LED built into each PMT 24 can be turned on. Either of these methods of exciting PMTs 24 is well known in the art. Where an LED is used as the light source, LED light is provided directly to each PMT 24. However, where a flood source of radiation is used, the radiation impacting crystal 22 generates light on emitter side 32 which is absorbed by PMTs 24.

Each PMT 24 generates an intensity signal on an associated bus 18 which is provided to an associated autotune amplifier 11. As indicated above, only PMT 9-1 and operation of hardware associated therewith will be explained hereinafter. Amplifier 9-1a receives the intensity signal from PMT 9-1 and steps up the received signal as a function of gain $G_a$ providing a stepped up signal to amplifier 15 via line 9-1c. Amplifier 15, in turn, steps up the signal received on line 9-1c by its high voltage gain $G_{hv}$ providing the final signal $S_f$ on line 9-1d. The final signal on line 9-1d is fed back via line 9-1f to autotuner 9-1e. Autotuner 9-1e is programmed such that, during the test sequence, tuner 9-1e maintains its associated final signal $S_f$ at a set or target value $S_{th}$ which is an ideal signal value corresponding to the known intensity of the light source. Where the associated final signal $S_f$ is less than the target value $S_{th}$, autotuner 9-1e increases its amplifier gain $G_a$ until the associated final signal $S_f$ is equal to target value $S_{th}$. Where final signal $S_f$ is greater than target value $S_{th}$ autotuner 9-1e decreases its associated gain $G_a$ until the final signal $S_f$ is equal to target value $S_{th}$.

With the high voltage gain $G_{hv}$ set to its maximum value $G_{hvmax}$, processor 17 monitors databus 40 to determine when any one of autotuners 13 can no longer maintain an associated final signal $S_f$ at the target value $S_{th}$ and, when any autotuner 13 cannot maintain the desired relationship, processor 17 stores the instantaneous high-voltage gain $G_{hv}$ as a failure point for the PMT 24 associated with the autotuner 13 which can no longer maintain the desired relationship. Assuming that each autotuner 13 can maintain its associated final signal $S_f$ equal to the target value $S_{th}$ when the high voltage gain $G_{hv}$ is set to its maximum value, processor 17 begins to step down the high voltage gain $G_{hv}$ via signals on line 50.

For example, where the initial high voltage gain $G_{hv}$ was set to 2300 volts, processor 17 decreases the high voltage gain $G_{hv}$ to, say 2295 volts. After decreasing the high voltage gain $G_{hv}$, processor 17 again monitors each autotuner 13 to determine whether or not any autotuners have experienced autotune failure. If one of the autotuners 13 has failed to maintain an associated final signal $S_f$ equal to the target value $S_{th}$, processor 17 again stores the instantaneous high voltage gain $G_{hv}$ as the failure point for the specific autotuner 13 which failed.

This process of decreasing the high voltage gain $G_{hv}$ and monitoring autotuners 13 for autotune failure continues until processor 17 has identified a failure point for each PMT 24 in detector 10. At that point, processor 17 can analyze the stored data to predict PMT failure.

Referring now to FIGS. 1 and 2, the inventive method will be described in the context of an exemplary flowchart. Initially, at process block 100 processor 17 sets the high voltage gain $G_{hv}$ equal to the maximum high voltage gain $G_{hvmax}$. Next, at step 102 processor 17 initializes two variables N and M which correspond to rows and columns, respectively, of the PMT array. As indicated above, it has been assumed that the array in the present example includes seven rows N and nine columns M.

At decision block 104, processor 17 monitors failure signal $\zeta_1$, from the autotuner 13 associated with PMT 1-1. Where no failure signal for PMT 1-1 has occurred, control passes to decision block 108. Where a failure signal corresponding to PMT 1-1 has occurred, control passes to process block 106. At block 106, processor 17 stores the instantaneous high voltage gain $G_{hv}$ as a gain failure point $G_{fp}$ correlated with PMT 1-1. Then, control passes to block 108.

At decision block 108, processor 17 determines whether or not the instantaneous row count N is equal to the maximum row count for detector 10. In the present case, the maximum row count $N_{max}$ is 7 (i.e. there are seven rows of PMTs). Thus, the first time through when N is one, control passes from decision block 108 to process block 110 where the row count N is incremented by one. Next, control passes back up to decision block 104. At decision block 104, processor 17 monitors the output of the autotuner 13 associated with the next PMT 1-2 (i.e. N=2, M=1) to determine if autotune failure occurred with respect to PMT 1-2. Again, where autotune failure has not occurred, control passes directly to block 108. However, if autotune failure has occurred, control passes to block 106 where processor stores the instantaneous high voltage gain $G_{hv}$ as gain failure point $G_{fp}$ correlated with the PMT number 2-1.

Control again passes to block 108. Eventually, once the instantaneous row number N is equal to the maximum row number $N_{max}$ (i.e. 7), control passes to block 112 where the instantaneous row number N is again set to one and the instantaneous column number M is increased by one. Thereafter, at block 114, the instantaneous column number M is compared to a maximum column number $M_{max}$. In the present case, because there are nine PMT columns, maximum number $M_{max}$ is nine. Where the instantaneous column number M is not equal to the maximum number $M_{max}$, control again passes up to block 104. Control cycles through blocks 104, 106,108,110,112 and 114 until instantaneous column number M is equal to maximum number $M_{max}$. At this point, control passes to block 116.

At block 116, processor 17 decreases the instantaneous high voltage gain $G_{hv}$ by subtracting a small value $\Delta G_{hv}$.

Next, at decision block 118 processor 17 determines whether or not the instantaneous high voltage $G_{hv}$ is equal to a minimum high voltage gain value $G_{hvmin}$ (e.g. 1173 volts). If gain $G_{hv}$ is not equal to minimum value $G_{hvmin}$, control passes again up to block 102 where instantaneous row and column values N, M, respectively, are again set to one. Thereafter, processor 17 control steps through blocks 104, 106,108,110,112, 114,116 and 118 a number of times until the instantaneous gain $G_{hv}$ is equal to zero. Prior to $G_{hv}$ equaling value $G_{hvmin}$, processor 17 will have stored a gain failure point $G_{fp}$ (see process block 106) for each PMT 1-1 through 9-7 in array 69. Thus, once gain $G_{hv}$ equals value $G_{hvmin}$, the test sequence has been completed.

Each time the test sequence illustrated in FIG. 2 is performed, data generated thereby is stored in a table wherein the date is correlated both with specific PMTs 1-1 through 9-7 and a specific time $\tau_1$ through $\tau_{100}$. For example, referring to FIG. 3, an exemplary table may include a PMT column C-1 and 100 separate time columns C-2 through C-101. In addition, elements in column C-1 through C-101 would form 63 separate rows R-1 through R-63, a separate row corresponding to each of PMTs 1-1 through 9-7. Each of time columns C-2 through C-101 corresponds to a separate test sequence. For example, each of times $\tau_1$ through $\tau_{100}$ may correspond to a test performed on a different day and consecutive tests may be separated by a number of days. For the purposes of this explanation it will be assumed that each two consecutive times $\tau_1$, through $\tau_{100}$ is separated by four days. In this case, data in the table corresponds to 400 days of camera operation (i.e. there are 100 times and each time represents a four day period).

Figure 3:
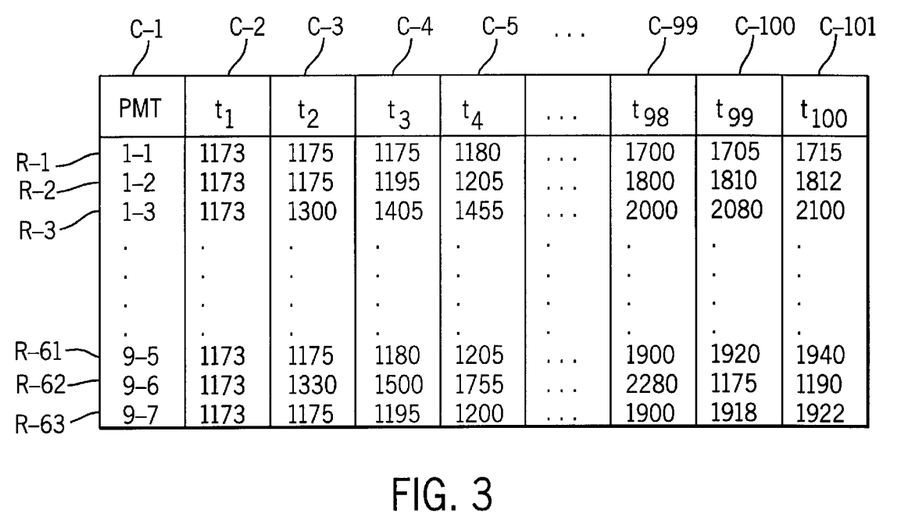
FIG. 3 is an exemplary data table formed by the system of FIG. 1 when the method of FIG. 2 is performed.

Referring specifically to row R-1 which corresponds to PMT 1-1, during a first test sequence corresponding to time $\tau_1$, as would be expected, the autotuner 13 associated with PMT 1-1 is capable of maintaining an associated final signal $S_f$ equal to the target value $S_{th}$ even when the high voltage gain $G_{hv}$ was extremely low. In the example illustrated, $G_{hv}$ corresponds to a value 1175 which is nearly as low as the high voltage gain $G_{hv}$ can go (i.e. 1173 volts). Similarly, during the test sequence corresponding to time $\tau_1$, each of the other gain failure points associated with PMTs 1-2 through 9-7 is 1175.

As time goes on, it can be seen that during the test sequence four days later which corresponds to time $\tau_2$, some of the gain failure points $G_{fp}$ occurred at higher high voltage gain $G_{hv}$ values while others remained unchanged. For example, during the sequence corresponding to time $\tau_2$, the gain failure points $G_{fp}$ corresponding to PMTs 1-1, 1-2, 9-5 and 9-7 remained unchanged at 1175. However, the gain failure points $G_{fp}$ corresponding to PMTs 1-3 and 9-6 changed to 1300 and 1330, respectively, indicating that PMTs 1-3 and 9-6 will likely cause autotune failure more rapidly than the other PMTs for which data is provided in the table. Continuing, looking at the data corresponding to the test sequence associated with time $\tau_3$, while the gain failure points for PMTs 1-1, 1-2, 9-5 and 9-7 have either not changed or have only changed a small amount, clearly, the gain failure points for PMTs 1-3 and 9-6 have changed appreciably.

Continuing, referring still to FIG. 3, in column C-99 where gain failure point $G_{fp}$ information is provided for time $\tau_{98}$, it can be seen that PMT 1-3 will soon cause autotune failure as its gain failure point corresponds to the 2000 volts which is very close to the maximum high voltage gain $G_{hvmax}$ 2300 volts. Similarly, PMT 9-6, which has a gain failure point $G_{fp}$ corresponding to 2280 volts will also fail very quickly. The other PMTs for which data is provided still appear to have a relatively long useful life and therefore need not be replaced.

Continuing, referring to column C-100 which corresponds to a test sequence taking place at time $\tau_{99}$, it can be seen that PMT 9-6 has been replaced and therefore the gain failure point $G_{fp}$ again corresponds to a relatively low high voltage gain $G_{hv}$ 1175.

In addition to just using the last gain failure point $G_{fp}$ associated with each PMT 1-1 through 9-7 to predict future PMT failure, the historical trend for each specific PMT 1-1 through 9-7 can be and should be used according to the present invention to more accurately predict when PMT failure will occur. For example, referring to FIG. 4, four separate curves 24a, 24b, 24c and 24d, corresponding to four separate PMTs 24 are illustrated showing historical gain failure point information plotted as a function of test sequence times $\tau_1$ through $\tau_{100}$. Referring specifically to curve 24a, the PMT associated with this curve shows a relatively steady, slow and consistent deterioration pattern and therefore, at time $\tau_{100}$, it can generally be recognized that this PMT will not cause autotune failure for a relatively long time. Referring specifically to curve 24b, initially, between times $\tau_1$ and $\tau_{60}$, curve 24b is every similar to 24a and therefore, up to time $\tau_{60}$, it appears as though the PMT associated with curve 24b will have a relatively long life. However, after time $\tau_{60}$, the historical data represented by curve 24b indicates that the duration over which an associated PMT will be useful will be cut short. Therefore, after time $\tau_{60}$, once a pattern has been established which indicates a short PMT useful life, maintenance (e.g. replacement) of the associated PMT can be scheduled.

Figure 4:
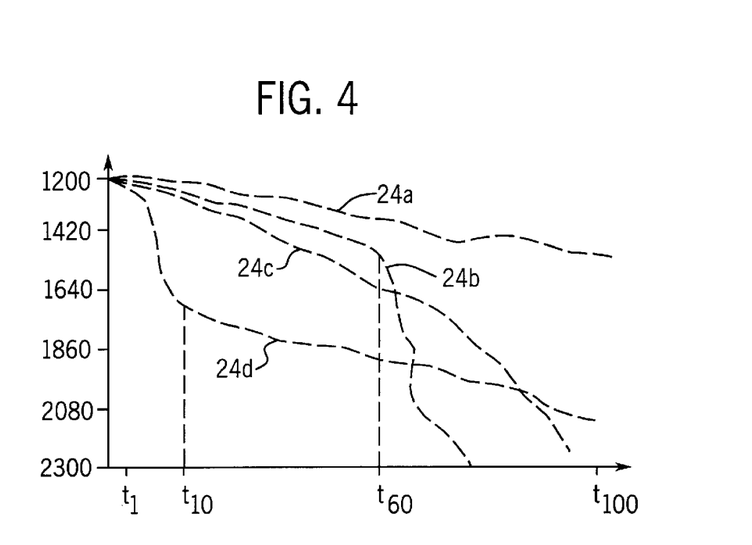
FIG. 4 is a graph illustrating historical PMT failure points which can be formed using data like the exemplary data provided in FIG. 3.

Referring to curve 24c, between times $\tau_1$ and $\tau_{10}$, this curve would indicated that an associated PMT will have a shorter useful life than the PMT associated with curve 24b. However, shortly after time $\tau_{60}$, the recent historical data would indicate that the PMT associated with curve 24c will have a longer useful life than the PMT associated with curve 24b. This in fact ends up being the case as can be seen by comparing curves 24b and 24c after time $\tau_{60}$.

Referring still to FIG. 4 and specifically to curve 24d, between times $\tau_1$ and $\tau_{10}$, curve 24d is extremely steep and therefore between $\tau_1$ and $\tau_{10}$, the historical data would seem to indicate that the PMT associated with curve 24d would be relatively short and clearly would be much shorter than the expected useful life of any of the PMTs associated with curves 24a, 24b, or 24c. However, between times $\tau_1$ and $\tau_{60}$, curve 24d becomes less steep as wear characteristics of an associated PMT taper off. Thus, the historical data between times $\tau_1$ and $\tau_{60}$, indicates that the initial assessment of PMT useful life which was formulated between times $\tau_1$ and $\tau_{10}$ may in fact be incorrect in that the PMT associated with curve 24d may have a longer useful life. In fact, referring to curve 24d after $\tau_{60}$, the useful life of the PMT associated with curve 24d is relatively long.

The data illustrated on FIG. 4 can either be provided to a system 8 operator (i.e. a technician or a physician) during maintenance so that the operator can determine a suitable maintenance schedule for detector 10 or, in the alternative, the data illustrated in FIG. 4 and also in FIG. 3 could be processed by processor 17 to determine when PMT maintenance is required and thereafter could schedule maintenance and replacement of PMTs which are close to causing autotune failure.

It should be understood that the methods and apparatuses described above are only exemplary and do not limit the scope of the invention, and that various modifications could be made by those skilled in the art that would fall under the scope of the invention.

To apprise the public of the scope of this invention, we make the following claims:

We claim:

1. A method for use with a gamma camera which includes an array of photomultiplier tubes (PMT), each PMT characterized by an intrinsic gain and providing an initial signal when light is detected, the camera also including a separate autotuner amplifier for each PMT, the amplifier receiving and modifying an initial signal as a function of an amplifier gain generating an autotuner signal, the camera also including a single high voltage amplifier which receives each autotuner signal and modifies each autotuner signal as a function of an adjustable high voltage gain thereby generating a final signal for each PMT, the camera also including an autotuner for each autotuner amplifier which, during a test sequence when a light source of known intensity is used to excite an associated PMT, adjusts the gain of an associated autotuner amplifier such that each final signal is essentially equal to a target value, complete failure occurring when both an amplifier and the high voltage gains are at their highest values and an associated PMT's final signal is less than the target value, the method for predicting complete failure, the method comprising the steps of, during a test sequence:

(a) setting the high voltage gain to its maximum value;

(b) monitoring each PMT for autotune failure;

(c) when autotune failure first occurs in a PMT, storing the instantaneous high voltage gain as a failure point for the failed PMT;

(d) when autotune failure has occurred in each PMT, skipping to step (g);

(e) decreasing the high voltage gain by a fraction of the maximum value;

(f) repeating steps (b) through (e); and (g) analyzing each failure point to predict when complete failure will occur for each PMT.

2. The method of claim 1 also for generating historical data which can be used during the analyzing step to predict complete failure, the method further including the steps of, during consecutive periodic test sequences, correlating failure points with time and storing the time and failure points in a PMT data table for analysis during the next step (g).

3. The method of claim 2 wherein the step of analyzing further includes the steps of, for each PMT, plotting the data in the data table and analyzing the resulting curve to predict complete failure as a function of a trend exhibited by the resulting curve.

4. An apparatus for use with a gamma camera which includes an array of photomultiplier tubes (PMT), each PMT characterized by an intrinsic gain and providing an initial signal when light is detected, the camera also including a separate autotuner amplifier for each PMT, the amplifier receiving and modifying an initial signal as a function of an amplifier gain generating an autotuner signal, the camera also including a single high voltage amplifier which receives each autotuner signal and modifies each autotuner signal as a function of an adjustable high voltage gain thereby generating a final signal for each PMT, the camera also including an autotuner for each autotuner amplifier which, during a test procedure when a light source of known intensity is used to excite an associated PMT, adjusts the gain of an associated autotuner amplifier such that each final signal is essentially equal to a target value, complete failure occurring when both an amplifier and the high voltage gains are at their highest values and an associated PMT's final signal is less than the target value, the apparatus for predicting complete failure, the apparatus comprising:

(a) an adjustable amplifier for, during a test sequence, setting the high voltage gain to its maximum value and decreasing the high voltage gain from the maximum value to a minimum value;

(b) an autotuner for monitoring each PMT for autotune failure; and (c) a processor for, when autotune failure first occurs in a PMT, storing the instantaneous high voltage gain as a failure point for the failed PMT and for analyzing each failure point to predict when complete failure will occur for each PMT.

5. The apparatus of claim 4 also for generating historical data which can be used during the analyzing step to predict complete failure, the processor also, during consecutive periodic test sequences, correlating failure points with time and storing the time and failure points in a PMT data table for analysis to predict when complete failure will occur for each PMT.

6. The apparatus of claim 5 wherein the processor is also capable of, for each PMT, plotting the data in the data table and analyzing the resulting curve to predict complete failure as a function of a trend exhibited by the resulting curve.

7. A method for use with a photomultiplier tube (PMT) for predicting future PMT operating characteristics, the PMT characterized by an intrinsic gain and providing an initial signal when light is detected, the PMT linked to and providing the initial signal to at least one amplifier for increasing the initial signal as a function of an adjustable gain to provide a specific signal, the method comprising the steps of, during a test sequence:

(a) providing a light source of known intensity to the PMT;

(b) adjusting the adjustable gain until a specific signal value is achieved; and (c) analyzing the adjustable gain to predict future PMT operating characteristics.

8. The method of claim 7 wherein the step of adjusting includes the steps of setting the adjustable gain to a maximum value and decreasing the gain until the specific signal value is achieved.

9. The method of claim 7 wherein the method can be used to predict PMT failure and the specific signal value corresponds to a PMT failure point.

10. The method of claim 7 wherein the at least one amplifier includes two amplifiers, an autotuner amplifier and a high voltage amplifier, the autotuner amplifier receiving and modifying the initial signal as a function of an autotuner amplifier gain generating an autotuner signal, the high voltage amplifier receiving and modifying the autotuner signal as a function of the adjustable gain thereby generating the specific signal, an autotuner linked to the autotuner amplifier which adjusts the autotuner amplifier gain such that the specific signal is essentially equal to a target value, complete failure occurring when both the amplifier and adjustable gains are at their highest values and the PMT's specific signal is less than the target value, the method for predicting complete failure, the step of adjusting including modifying the high voltage gain, monitoring the PMT for autotune failure and, when autotune failure first occurs, storing the instantaneous high voltage gain as a failure point.

11. The method of claim 7 wherein there are several PMTs arranged to form a gamma camera and the method is performed for each PMT within the camera to predict future PMT operating characteristics for each PMT.

12. The method of claim 7 also for generating historical data which can be used during the analyzing step to predict future PMT operating characteristics, the method further including the steps of, after adjusting, storing the adjustable gain and, during consecutive periodic test sequences, correlating the adjustable gains with time and storing the time and adjustable gains in a PMT data table for analysis.

13. The method of claim 12 wherein the step of analyzing further includes the steps of plotting the time and adjustable gains in the data table and analyzing the resulting curve to predict complete failure as a function of a trend exhibited by the resulting curve.

14. An apparatus for use with a photomultiplier tube (PMT) for predicting future PMT operating characteristics, the PMT characterized by an intrinsic gain and providing an initial signal when light is detected, the PMT linked to and providing the initial signal to at least one amplifier for increasing the initial signal as a function of an adjustable gain and providing a specific signal, the apparatus comprising:

(a) a source to provide light of known intensity to the PMT;

(b) an amplifier adjust for modifying the adjustable gain until a specific signal value is achieved; and (c) a processor for analyzing the adjustable gain to predict future PMT operating characteristics.

15. The apparatus of claim 14 wherein the amplifier adjusts the adjustable gain by setting the adjustable gain to a maximum value and decreasing the gain until the specific signal value is achieved.

16. The apparatus of claim 14 wherein the apparatus can be used to predict PMT failure and the specific signal value corresponds to a PMT failure point.

17. The apparatus of claim 14 wherein the at least one amplifier includes two amplifiers, an autotuner amplifier and a high voltage amplifier, the autotuner amplifier receiving and modifying the initial signal as a function of an autotuner amplifier gain generating an autotuner signal, the high voltage amplifier receiving and modifying the autotuner signal as a function of the adjustable gain thereby generating the specific signal, an autotuner linked to the autotuner amplifier which adjusts the gain of the autotuner amplifier such that the specific signal is essentially equal to a target value, complete failure occurring when both the amplifier and adjustable gains are at their highest values and the PMT's specific signal is less than the target value, the apparatus for predicting complete failure, the amplifier modifying by changing the high voltage gain and monitoring the PMT for autotune failure and, when autotune failure first occurs, the processor storing the instantaneous high voltage gain as a failure point for analysis.

18. The apparatus of claim 14 wherein there are several PMTs arranged to form a gamma camera and the apparatus includes a source and amplifier for each PMT and a single processor for analyzing an adjustable gain for each PMT.

19. The apparatus of claim 14 also for generating historical data which can be used during the analyzing step to predict future PMT operating characteristics, the processor also, after adjusting, storing the adjustable gain and, during consecutive periodic test sequences, correlating the adjustable gains with time and storing the time and adjustable gains in a PMT data table for analysis.

20. The apparatus of claim 19 wherein the processor also plots the time and adjustable gains in the data table and analyzing the resulting curve to predict complete failure as a function of a trend exhibited by the resulting curve.

21. A gamma camera control system having a programmed processor for use with a photomultiplier tube (PMT) for predicting future PMT operating characteristics, the PMT characterized by an intrinsic gain and providing an initial signal when light is detected, the PMT linked to and providing the initial signal to at least one amplifier for increasing the initial signal as a function of an adjustable gain and providing a specific signal, during a test sequence, a light source of known intensity providing light to the PMT, during a test sequence, the processor:

adjusting the adjustable gain until a specific signal value is achieved;

analyzing the adjustable gain to predict future PMT operating characteristics.

22. The system of claim 21 wherein, to adjust, the processor initially sets the adjustable gain to a maximum value and thereafter decreases the gain until the specific signal value is achieved.

23. The system of claim 21 wherein the processor is used to predict PMT failure and the specific signal value corresponds to a PMT failure point.

24. The system of claim 21 wherein the at least one amplifier includes two amplifiers, an autotuner amplifier and a high voltage amplifier, the autotuner amplifier receiving and modifying the initial signal as a function of an autotuner gain generating an autotuner signal, the high voltage amplifier receiving and modifying the autotuner signal as a function of the adjustable gain thereby generating the specific signal, the processor adjusting the autotuner amplifier gain such that each specific signal is essentially equal to a target value, complete failure occurring when both the amplifier and adjustable gains are at their highest values and the PMT's specific signal is less than the target value, the processor for predicting complete failure, the processor adjusting by modifying the high voltage gain, monitoring the PMT for autotune failure and, when autotune failure first occurs, storing the instantaneous high voltage gain as a failure point.

25. The system of claim 21 wherein there are several PMTs arranged to form a gamma camera and the processor generates and analyzes amplifier gains for each PMT within the camera to predict future PMT operating characteristics for each PMT.

26. The system of claim 21 wherein the processor is also for generating historical data which can be used during the analyzing step to predict future PMT operating characteristics, the processor also, after adjusting, storing the adjustable gain and, during consecutive periodic test sequences, correlating the adjustable gains with time and storing the time and adjustable gains in a PMT data table for analysis.

* * * * *